(12) United States Patent
Terry

(10) Patent No.: US 8,215,423 B2
(45) Date of Patent: Jul. 10, 2012

(54) STACK AXLE ASSEMBLY AND TRANSPORTERS HAVING THE SAME

(75) Inventor: Melvin Dean Terry, Sioux Falls, SD (US)

(73) Assignee: Intelliport Corporation, Bothell, WA (US)

( * ) Notice: Subject to any disclaimer, the term of this patent is extended or adjusted under 35 U.S.C. 154(b) by 312 days.

(21) Appl. No.: 12/588,695

(22) Filed: Oct. 23, 2009

(65) Prior Publication Data

US 2011/0094815 A1  Apr. 28, 2011

(51) Int. Cl.
*B60B 35/00* (2006.01)
*B60K 17/30* (2006.01)

(52) U.S. Cl. .......................... 180/24; 414/458

(58) Field of Classification Search ............... 180/23–24; 414/458

See application file for complete search history.

(56) References Cited

U.S. PATENT DOCUMENTS

| | | | |
|---|---|---|---|
| 3,756,350 A * | 9/1973 | Gandolfo et al. ............. | 187/222 |
| 4,431,084 A * | 2/1984 | Jones ............................. | 180/23 |
| 5,199,524 A | 4/1993 | Ivancic | |
| 5,374,879 A | 12/1994 | Pin et al. | |
| 5,379,842 A | 1/1995 | Terry | |
| 5,624,004 A | 4/1997 | Watanabe | |
| 6,017,181 A * | 1/2000 | Johnston ........................ | 414/459 |
| 6,336,514 B1 | 1/2002 | Ramacher et al. | |
| 6,341,793 B2 * | 1/2002 | Braun ........................ | 280/414.1 |
| 6,540,039 B1 | 4/2003 | Yu et al. | |
| 6,564,955 B2 * | 5/2003 | Franzen et al. ............... | 212/301 |
| 6,612,601 B1 * | 9/2003 | Granlind ..................... | 280/414.1 |
| 6,722,610 B1 | 4/2004 | Rawdon et al. | |
| 7,137,470 B2 | 11/2006 | Götz | |
| 2003/0127259 A1 * | 7/2003 | Logstrup ........................ | 180/23 |
| 2006/0113123 A1 | 6/2006 | Chamaillard et al. | |
| 2006/0113124 A1 | 6/2006 | Durif | |
| 2007/0110549 A1 * | 5/2007 | Waisanen ...................... | 414/458 |
| 2008/0111327 A1 | 5/2008 | Rhodes et al. | |
| 2008/0159831 A1 * | 7/2008 | Davis ......................... | 414/140.3 |
| 2009/0232634 A1 * | 9/2009 | Waisanen ...................... | 414/816 |

OTHER PUBLICATIONS

U.S. Appl. No. 12/292,635, filed Nov. 21, 2008, Melvin Dean Terry, Intelliport Corporation.

* cited by examiner

*Primary Examiner* — Kevin Hurley

(74) *Attorney, Agent, or Firm* — Staas & Halsey LLP

(57) ABSTRACT

A stack axle assembly as used in a cask transporter or an horizontal storage module (HSM) gantry transporter. The stack axle assemblies include a slew gear; an upper bearing; a lower bearing; a vertical cylinder retained by the slew gear, upper bearing and lower bearing; an independent driver wheel and idler wheel revolving on a common shaft/trunnion assembly attached to the bottom of the vertical cylinder; a frame assembly formed on top of the vertical cylinder, the frame assembly including one or more drive motors connecting an upper drive assembly downwardly to a driven assembly mounted between the idler wheel and driver wheel; and a slew driver motor to drive the slew gear.

10 Claims, 10 Drawing Sheets

STACK AXLE ASSEMBLY AND TRANSPORTERS HAVING THE SAME

BACKGROUND OF THE INVENTION

1. Field of the Invention

The present invention relates to a transporter to carry very heavy loads. More particularly, the present invention relates to a transporter with single wheel power driven axle assemblies that have omni-directional steering, fluid equalizing suspension, and on-center axle rotation capability in order to carry very heavy loads.

2. Description of the Related Art

A nuclear reactor operates by facilitating a controlled nuclear chain reaction in a reactor core. Typically, the nuclear reaction is fueled by an isotope of uranium, which is supplied to the reactor core in a plurality of elongated fuel rods, which are typically metallic structures that are packed with uranium pellets.

When the fuel rods must be removed and replaced, the spent nuclear fuel is typically temporarily stored in water pools that dissipate generated thermal energy and attenuates radiation emitted from the spent nuclear fuel. For long-term storage, the spent fuel rods are transferred to either horizontal or vertical radiation shielded and ventilated concrete casks. The present invention deals with vertical-type cask systems. These casks used to store the spent nuclear fuel are vertical-standing, cylindrical, radiation-sealing concrete casks typically weighing at least 150 to 200 tons. Once the spent nuclear fuel is in a cask, the cask needs to be transported from the nuclear refueling facility to an Independent Spent Fuel Storage Installation (ISFSI). The ISFSI is designed for the long term storage of decaying radioactive materials.

Various options exist for transporting vertical-type casks both within a nuclear refueling facility and from a nuclear refueling facility to an ISFSI. These options include heavy multi axle specialized carrier trailers, industrial air cushion devices (so called "air bearings"), overhead cranes, and specialized vertical lift gantry frames attached to a crawler tractor bed assemblies. These options all have significant disadvantages. For example, for vertical-type casks, heavy multi axle specialized carrier trailers require an extended operating space and are not capable of engaging and moving the casks out of the fuel building(s), or of doing the actual positioning the cask in the close spacing requirements within the ISFSI. Removing the cask from the fuel building typically requires some type floor level transfer capability such as industrial air cushion devices (air bearings), heavy capacity roller devices, or in-floor rails with low profile transfer cars. At the ISFSI, final spacing is accomplished by transferring the casks from the trailers by using industrial air cushion devices (air bearings) or heavy capacity roller devices. Furthermore, a disadvantage of air cushion devices is that they require a large pressurized air supply and a smooth, non-porous surface in order to maintain lift and operate properly. Moreover, specialized vertical lift gantry frames attached to crawler tractor bed assemblies have the disadvantage of a large size, especially height, and a lack of maneuverability. The crawler treads tend damage operating surfaces when skid turning under these types of loading conditions.

Another option for horizontal type spent nuclear fuel casks are In Plant-Self-Propelled Modular Transporters (IP-SPMT). An IP-SPMT refers to a low-profile deck, multi-axle, self-propelled transporter, with all-wheel drive independent suspension axle assemblies that are typically used in combinations to carry loads heavier than 80 tons. An IP-SPMT is typically internal combustion engine-electric powered and has six to twelve or more on-center rotation axle assemblies. The axles can be independently steered by varying each wheel motor speed and direction.

However, in vertical-type spent nuclear fuel cask applications, existing IP-SPMT devices are not sufficient because of the need to pick and place the vertical cask directly to or from the operating surface. One IP-SPMT device proposed by the inventor of the present application utilizes uniload axle assemblies as disclosed in U.S. Pat. No. 5,379,842, wherein the axles assemblies are gear motor rotated for steering coupled with hydraulic differentially power driven wheels. Referring to FIG. 4, the uniload axle assembly 106 includes a drive motor 14 having mounted thereon a pinion gear 16 in mesh with a ring gear 18 which is bolted to a circular plate as explained hereinafter. The drive motor 14 is bolted to a piston top plate to which is secured a square machined upper shaft 26 to transmit the torque from the top plate to the wheel set via a square torque plate upper flange 28 which is sectional so that it may be removed. A pair of wheels 34 are mounted to axles which form a relatively fixed part of wheel truck 38 which includes a yoke portion. Trunnions 42 are mounted on the sides of the bottom casing which houses a piston secured to the upper shaft 26. Ongoing design versions of the same patent concept eliminate the gear motor steering for differential steering where all-wheels are electrically driven with computer controlled differential steering.

Although the uniload axle assembly 106 disclosed in U.S. Pat. No. 5,379,842 addresses the problem in the conventional art overloading operating surfaces, the disclosed uniload axle assembly 106 has a foot print too large for some applications, including vertical cask transportation.

Accordingly, what is needed is a heavy capacity self-loading transporter with an on-center rotation independent axle assembly that is devoid of scrubbing action while turning under full load so that casks can be moved from nuclear refueling facilities having narrow entry ports and restricted door heights to an ISFSI.

SUMMARY OF THE INVENTION

It is an aspect of the present invention to provide a stack axle assembly for use in a transporter, including a slew gear; an upper bearing; a lower bearing; a vertical cylinder retained by the slew gear, upper bearing and lower bearing; an independent driver wheel and idler wheel revolving on a common shaft/trunnion assembly attached to the bottom of the vertical cylinder; and a frame assembly formed on top of the vertical cylinder. The frame assembly including a drive motor(s) connecting an upper drive assembly downwardly to a driven assembly mounted between the idler wheel and driver wheel.

The stack axle assembly may further include a slew driver motor to drive the slew gear.

In the stack axle assembly, the upper bearing may include one or more keyway slots that allow the vertical cylinder to travel vertically, while transmitting rotational torque force from the slew gear to the vertical cylinder.

In the stack axle assembly, the driver wheel may have a larger diameter than the idler wheel to accommodate compression and expansion of the driver wheel when encountering floor irregularities that would otherwise create uneven loading on the driver and idler wheels.

In the stack axle assembly, one wheel may be made of a softer compressive material than the other wheel.

It is a further aspect of the present invention to provide a cask transporter comprising a main body including a power compartment and a plurality of uniload axle or stack axle assemblies; two arms extending from the main body, each of the arms including a plurality of stack axle assemblies; and pawls are formed on the arms and main body to engage a cask.

In the cask transporter, the power compartment may include a power source; a processor; an AC electrical panel; a display; and a hydraulic power unit.

In the cask transporter, the unload axle assemblies may include an axle frame including a cylinder housing and hydraulic piston; and two or more wide faced solid elastomeric wheels on opposing sides of the axle frame. The wheels on each end of the axle are independently driven by an electric motor.

The stack axle supported portion of the design allows the structural shape of the cask transporter to be much narrower than the current crawler gantry configurations thereby allowing the stack axle cask transporter to enter the narrower fuel building doorways that are common in older nuclear plants. One disadvantage of the current crawler mounted gantries is that they require high doors, by their need to lift the casks from the top. The configuration of the current crawler mounted gantries places a bridge beam and hoisting attachments that can extend several feet above the top of the casks. In many cases the crawler mounted gantries can not enter the fuel building and casks have to be moved out of the building on air bearings, heavy roller devices, or some type of in-floor rail system, before the crawler can engage and carry them to the ISFSI; whereas, the stack axle cask transporter lifts the cask from the cask's bottom air vents and only need lift the cask a few inches, just enough to clear undulations or obstructions on the operating surface. In the case of entering or exiting the fuel building, the overhead door clearance need only be a few inches higher than the top of the cask and stack axle's very narrow legs accommodate the older narrow entry doors. From a safety standpoint the cask is totally secured within the stack axle cask transporter's structure.

It is a further aspect of the present invention to provide rigidly fixed and forward extended pawls at the aft base of a U-shaped cask transporter which will engage two or more of the air vents in the bottom of the casks, while two clamps located high on the transporters arms extend and lock to bear solidly against the forward sides of the cask, locking the cask into the transporter and holding it in the upright position without possibility of tipping forward. In addition, two self-locking toggle clamps provide backup support in the event of a main clamp failure.

This engagement means the time and effort to engage and disengage from the casks are dramatically reduced. Also safety is greatly increased by not requiring workmen to climb up high on top of the cask to position and attach the heavy lifting gear as is currently necessary with the crawler mounted gantries.

The narrow shape and omni-directional effortless maneuverability of the stack axle cask transporter dramatically increases the functionality of the system, particularly when placing casks in the narrow confines of the ISFSI storage pads. Those two factors, narrow shape and omni-directional maneuverability allow casks to be placed closer together, and thereby reduce the acreage required for a new or expanded ISFSI storage facility, which is an important factor for nuclear plants that have limited space.

In some applications that do not have crawler mounted gantries, a combination of air bearings, large mobile cranes, and low-boy heavy haul trailers are used to make the short trip from the fuel building to the storage pads. In these cases the spent fuel filled casks are moved from under the overhead cranes inside the fuel building to the outside by either air bearings, heavy roller-type devices, or in-floor rail mounted transfer cars. Outside the building a heavy lift mobile crane will set the cask onto a heavy-haul lowboy trailer. The trailer will be hauled to the nearby ISFSI storage pads and positioned. The mobile crane will be moved to the ISFSI and set up again at the storage pad site to lift the cask onto its storage pad location. In some cases, the storage pads are elevated to a height that is flush with the deck of the low-boy trailer and the cask are slid laterally from the trailer onto the storage pad using air bearings or heavy rollers. In the case of air bearings, safety is a more predominant issue. If the storage pads are not dead level or appropriate side guide restraints are not in place there is the issue of the frictionless air bearings moving off the desired travel path and crushing workmen between the moving load and an adjacent cask. With air bearings there are the issues of providing a smooth uninterrupted operating surface and the positioning of a large portable air compressor and the handling of large diameter hoses connecting to the load.

According to the present invention, the self-propelled stack axle cask transporter engages and lifts the casks off the floor from inside the fuel building and is driven directly to the final ISFSI storage pad location. The stack axle cask transporter's narrow shape and omni directional travel capability allows new or expanded ISFSI storage pads to have much narrowed alleys between single and double rows of stored casks. With its omni directional travel capability, the stack axle transporter can rotate on-center and provide infinitely accurate maneuvers in linear, lateral, or diagonal travel patterns to allow effortless precision placement of casks in tight, and otherwise difficult to access, storage locations.

Yet another aspect of the stacked axle technology is the adaptation into a rigging gantry configuration. In the case of horizontal storage systems, commonly known as "NUHOMS®", horizontal storage modules (HSMs) are large rectangular concrete box-shaped structures that are typically placed side by side in singular or double rows. The HSMs typically weigh roughly 260,000 lbs when they are fully assembled, and ready to be placed in the ISFSI. Currently, the heavy precast HSM components are shipped to the site on heavy haul trailers and must be assembled in their final locations, which is a slow and labor intensive activity requiring a large mobile crane. By adapting the stack axle technology, two multi-axle sill beams are interconnected at one end of the sill beam to provide a U-shaped structure. The interconnecting beam is raised in the center to allow it to pass over the decks of heavy haul trailers. Some heavy haul trailers have "goose neck" connection of the ends of the trailer deck. Wherein the trailer hydraulically lowers to the ground and one of the goose necks is removed to allow the transporter to center over the load. The interconnecting beam is also designed with a bolted connection to the sill beams, and a bolted center connection that will allow an intermediate beam to be bolted in place when a wider stance is required. The center of each sill beam is augmented with a hydraulic vertical telescoping gantry tower. The gantry towers are rigidly mounted to the sill beams and penetrate through to within a few inches of the ground when the stack axles are in their lowest positions. A heavy section wide flange beam, known as a "bridge girder", is mounted to the top of the gantry towers.

Typically, when used in standard rigging gantry applications, there will be two heavy steel plates with lifting eyes on the underside that are manually positioned on the bridge to be above the points of lift. In this stack axle gantry configuration, these movable lifting devices will have spring loaded rollers that, when not engaged with the load, allow them to lift and carry the weights of the lifting devices and the spreader bar assembly. Each movable lifting device will have a monorail-type tractor running on top of the bridge girder. These tractors are operated from the operator's console, which is used to electronically control all of the stack axle gantry's functionality.

The gantry will be used to assemble multiple HSMs in a staging area somewhere in the proximity of the ISFSI. Components are carried on the incoming heavy haul trailers in the lengthwise orientation. The "spreader beam" for the gantry is actually a rectangular device that is designed to lift and carry either linear or laterally oriented loads. In the case of an HSM assembly, all assembly will be done with the linear configuration. When it is time to switch over to carry the fully assembled HSMs, they have to be placed with the gantry in the lateral orientation. To accomplish this, the gantry moves over a raised platform and lowers the spreader beam onto the platform and disengages. The gantry then backs away, moves 90 degrees to its current orientation and then drives over the spreader beam from the new direction. The gantry lowers and engages the spreader from the new orientation to be able to pick and carry the HSMs in the lateral orientation. As the gantry moves over the first HSM to be placed, the operator will activate the tractor devices as necessary to best place them over the proper points to pick up the HSM. The gantry will lower, and the lifting straps will be threaded through the bottom air vents on the HSM, then lift the HSM for travel to its next position point in a single or double row configuration. In the single row configuration the gantry is straddling just one HSM.

However, for double row HSM assembly, the gantry will have been configured to straddle two HSMs placed end to end. Since the gantry is designed to be disassembled for transport between jobsites, the gantry would have been assembled with an extender beam placed in the center between the two sill beams and a longer and heavier capacity bridge beam would connect the two gantry towers. The heavy plate lifting devices and the spreader beam will be free to move to the center or to one side or the other of the bridge beam for first component assembly, and then precision placing the HSMs in either the left or right hand positions as the double row moves forward. Typically six to eight or more HSMs are placed in a single or double line row.

In this configuration, this type of gantry can become a valued tool for heavy riggers in general construction and plant assembly operation. The sill beams containing the stack axles can contain multiple rows of stack axles on each side, as well as designed with larger diameter barrels and wheels to accommodate virtually any capacity lifting requirement into the 1,000 ton range and still have all of the dexterity of a single row of stack axles.

The stack axle assemblies may include a slew gear; an upper bearing; a lower bearing; a vertical cylinder retained by the slew gear, upper bearing and lower bearing; an independent driver wheel and idler wheel revolving on a common shaft/trunnion assembly attached to the bottom of the vertical cylinder; a frame assembly formed on top of the vertical cylinder, the frame assembly including a drive motor(s) connecting an upper drive assembly downwardly to a lower driven assembly mounted between the idler wheel and driver wheel; and a slew driver motor to drive the slew gear.

In all transporter applications, the processor may include a multitude of machine logic controllers to control each of the uniload axle and stack axle functions. The steering mode controller performs steering algorithm calculations for the plurality of axle assemblies to handle steering functions linearly, laterally, diagonally, and rotationally, so that all axle assemblies are controlled synchronously. A speed/direction controller provides command signals to the individual axle assemblies. A suspension controller lifts and lowers the transporter and controls the mean travel height.

In the cask transporter, the load relief controller may decrease fluid pressure to the cylinder housing of selected single or pairs of axle assemblies to transfer their load onto surrounding fully pressurized cylinder housings in event of any single axle assembly malfunction.

In the cask transporter, the suspension controller may control fluid pressure acting on each of the hydraulic pistons of each of the axle assembly to provide interaction between multiple axle assemblies to negotiate undulating surface irregularities along the line of travel of the transporter.

In the cask transporter, the AC (alternating current) electrical panel may include a shore power connection as an alternate power source.

Additional aspects and/or advantages of the invention will be set forth in part in the description which follows and, in part, will be apparent from the description, or may be learned by practice of the present invention.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION OF THE PREFERRED EMBODIMENTS

Figure 1:
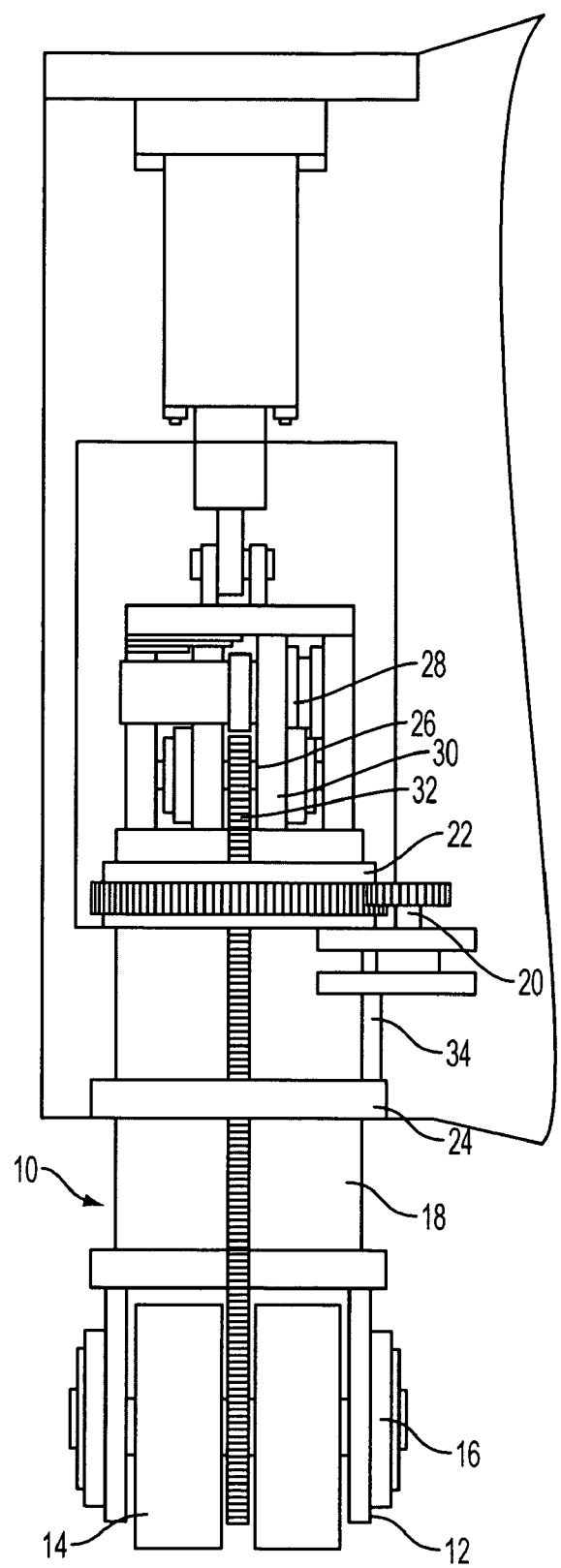
FIG. 1 is side view of the a stack axle assembly according to an embodiment of the present invention.

Reference will now be made in detail to the embodiments of the present invention, examples of which are illustrated in the accompanying drawings, wherein like reference numerals refer to the like elements throughout.

FIG. 1 shows an stack axle assembly 10 according to the present invention that allows self-propelled, omni directional travel in a heavy load transporter, where each "single wheel" is actually an independent driver wheel 12 and idler wheel 14 revolving on a common shaft/trunnion assembly 16, which is in turn attached to a open-center vertical rising cylinder 18 retained in a slew gear 20, upper bearing 22 and lower bearing 24. On the top of said vertical rising cylinder 18 is a frame assembly 26 in which a drive motor 28 connects an upper drive assembly 30 downwardly to a lower driven assembly 32 mounted between the idler wheel 14 and driver wheel 12. Although one drive motor 28 is shown, more than one drive motor may be employed with the present invention. Rotational torque for the on-center rotation of the stack axle assembly 10 is accomplished with a slew driver motor 34, frame-mounted to contact the top surface mounted combination of the slew gear 20 and bearings 22 and 24. The upper bearing 24 is designed with one or more keyway slots that allow the cylinder 18 to travel vertically, while transmitting rotational torque force to the cylinder 18.

To assure that sufficiently equalized loading on individual stack axle assemblies 10 is being applied to both the driver wheel 12 and idler wheel 14, the driver wheel 12 may have a different diameter and compressive material than its companion idler wheel 14 to accommodate compression and expansion of the wheels when encountering floor irregularities that would otherwise create uneven loading on the driver and idler wheels. When a load is applied to vertical cylinder 18, and the wheels 12 and 14 are on a laterally uneven surface, the driver wheel 12 may expand or compress to provide equalized loading across the surfaces of both wheels 12 and 14.

The ability to use an idler wheel 14 and driver wheel 12 on a common axle as a power driven as well as fully steerable on-center rotation axle assembly nearly eliminates rolling resistance due to wheel-scrubbing as the axle rotates about its vertical axis. Each wheel 12 and 14 is rotating about the axle's center, where the open space between the wheel elements forms the center of rotation and is not touching the operating surface. The natural tendency of a one-side-only driven dual wheel element to cause the axle to rotate only about its vertical axis is offset by a keyed relationship with the power driven slew gear 20 and bearing 22 that provides independent directional steering of each stack axle assembly 10.

To obtain assurance of equalized loading across a plurality of interacting stack axle assemblies 10, the weight of the load being carried is transmitted from the cask transporter's 100 (see FIG. 2A) carrier frame to each on-center rotation stack axle assembly 10 through vertical mounted hydraulic cylinders 18 that are attached to trunnion members 28 on top of each of the open-center vertical rising cylinders 18 frame assembly. The individual hydraulic cylinders 18 work in unison and synchronous motion, via either group-exchange of oil between cylinders or by computerized signal monitoring of individual hydraulic cylinder pressures through the use of pressure transducers in the individual cylinders or zone groupings of axle cylinders.

Each of the stack axle assemblies 10 and uniload axle assemblies 106 receives computer controlled steering commands that proportionally assure that every axle is either parallel (for straight line travel) or each axle is pointing at an exact single floating point of center of rotation, typically, somewhere along the X or Y center centerline. Such a point can be fixed in space (preprogrammed) for a transporter's rotation about any exact predetermined radius, or the point can "float" to allow random path precision steering in response to an operator's movement of a joystick-type controller.

Figure 2A:
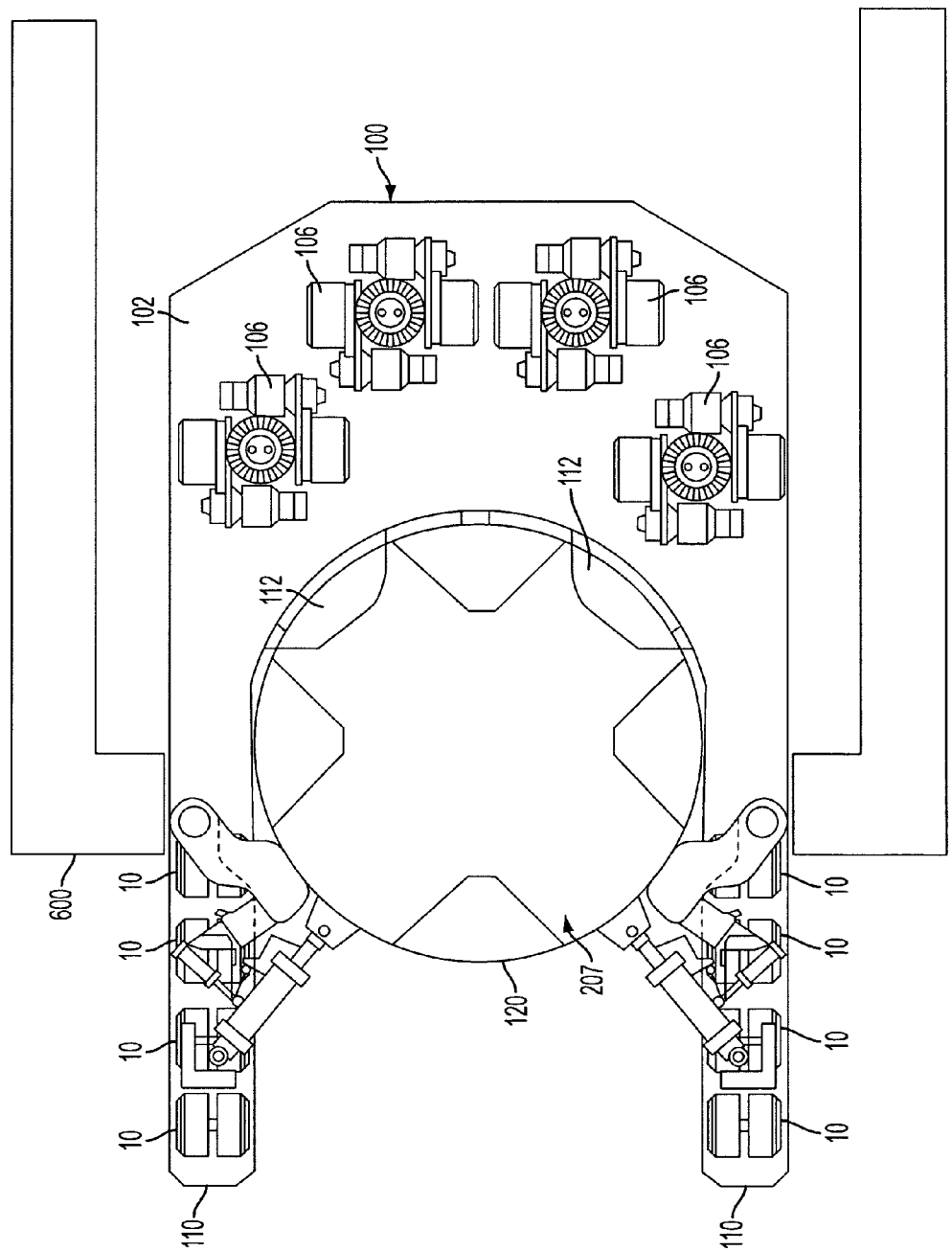
FIG. 2A is a side view of a cask transporter according to an embodiment of the present invention.

Referring to FIG. 2A, a plurality of the stack axle assemblies 10 may be advantageously employed in a cask transporter 100 according to the present invention to achieve a very narrow profile cask transporter 100 capable of effectively transporting spent nuclear fuel casks from a nuclear refueling building to an IFSFI.

Figure 3:
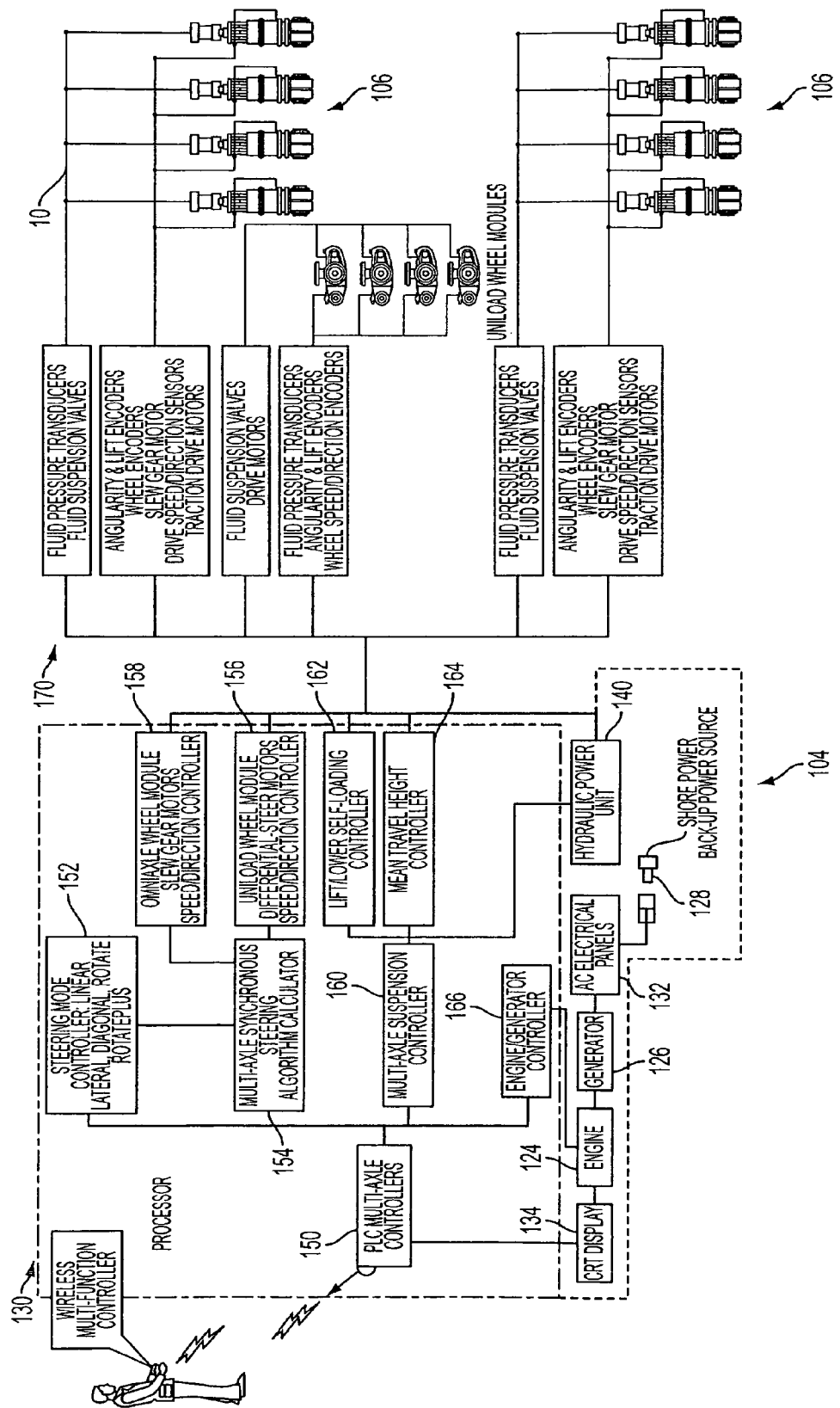
FIG. 3 is a control schematic of the cask transporter according to an embodiment of the present invention.

FIG. 2A shows a cask transporter 100 according to the present invention. The cask transporter 100 has essentially a U-shape and includes a main body 102 housing a power compartment 104 (as shown in FIG. 3), and a plurality of uniload axle assemblies 106. Essentially, the wide-faced elastomer wheels on the uniload axle assemblies 106 included are independently functioning and independently powered to accommodate differential steering.

Extending from both sides of the main body 102 of the cask transporter 100 are two arms 110. Housed within each of the arms 110 are a plurality of stack axle assemblies 10. Pawls 112 are formed on the arms 110 and main body 102 to engage a spent nuclear fuel cask 120, by entering into and lifting on the lower air vents 207 of the concrete casks. The embodiment of FIG. 2A shows two side-mount lifting pawls 112 for better weight transfer in the cask 120 and the transporter 100.

The cask transporter 100 illustrated in FIG. 2A shows four uniload axle assemblies 106, although it is contemplated for the cask transporter 100 to include more or less axle assemblies 106. Each of the uniload axle assemblies 106 has independent suspension, is capable of independently functioning in self-loading operations, and has on-center axle rotation.

The cask transporter 100 shown in FIG. 2A shows four stack axle assemblies 10 in each of the arms 110, although it is contemplated for the cask transporter 100 to include more or less stack axle assemblies 10.

By placing the stack axle assemblies in the arms 110, the frame dimensions of the cask transporter 100 are as narrow as possible which allows passage through narrow doors when entering nuclear refueling buildings 600. With its precision maneuvering capability the cask transporter 100 can function in a "creep speed" mode and smoothly maneuver through spaces, such as narrow fuel build doors with only fractions of an inch clearance. Further, despite their narrow profile, the stack axle assemblies 10 provide equalized loading for travel over uneven roadway surface between the refueling building and ISFSI storage pads.

Figure 2B:
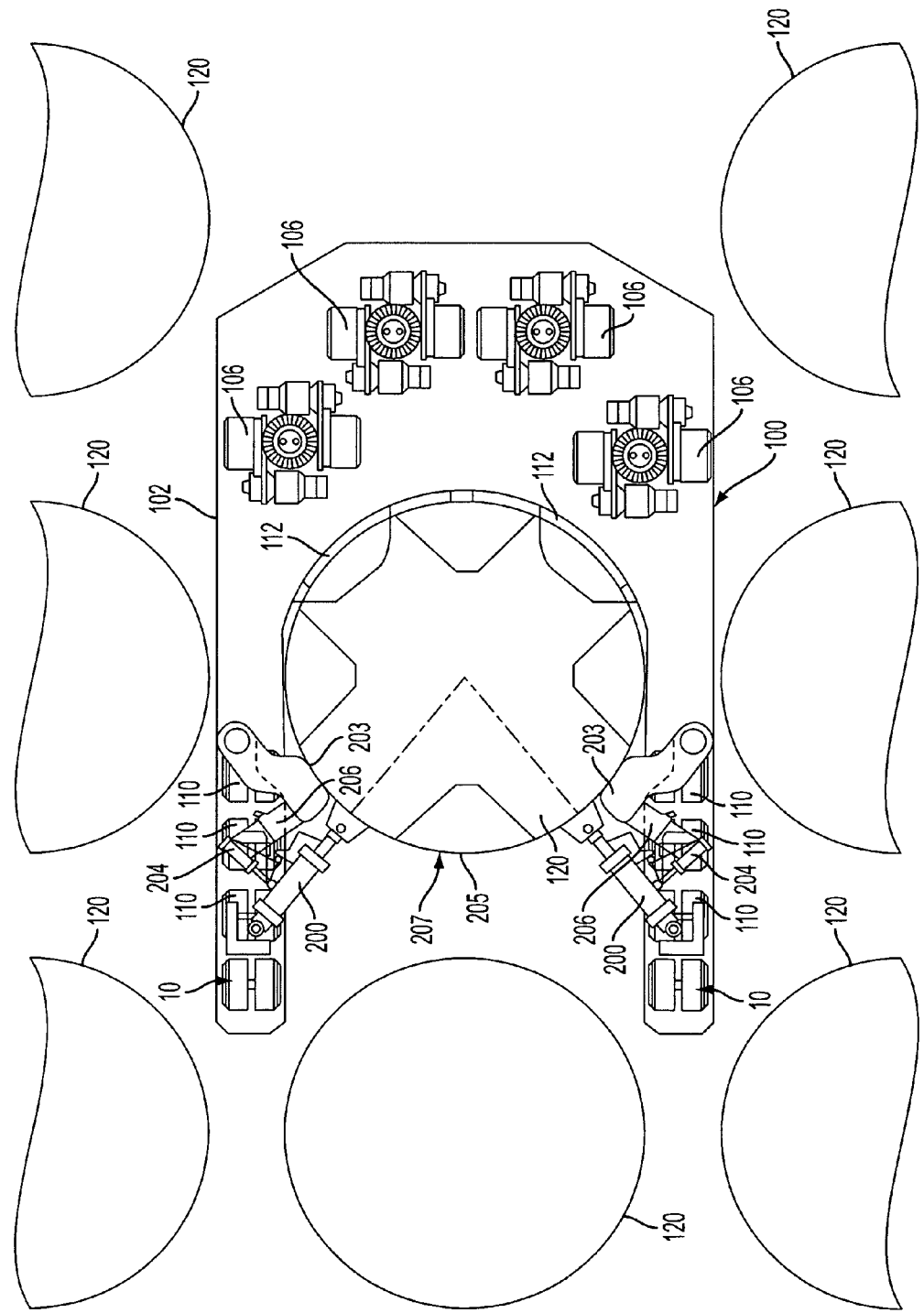
FIG. 2B is a side view of a cask transporter according to an embodiment of the present invention.

Referring to FIG. 2B, the central open portion of the cask transporter 100 is dimensioned and configured to accommodate a spent nuclear fuel cask 120. Pawls 112 are formed on the arms 110 and main body 102 to engage the spent nuclear fuel cask 120, by entering into and lifting on the lower air vents 207 of the concrete casks. More specifically, rigidly fixed and forward projecting pawls 112 at the aft base of the U-shaped cask transporter are capable of engaging air vents at the bottom of the spent nuclear fuel cask 120, while locking clamps 200, located high on the structure's forward protruding arms will unfold from their narrow stored position by rotating laterally by their alignment cylinders 204 and aligning with the cask's center axis 205 and then extending engagement pads to solidly press the cask walls against hard rubber restraint pads 201, thereby solidly encapsulating the cask. At which point self-locking back up toggle arms 203 will rotate into position in close proximity or light contact with the outside edge of the cask 120. The toggle locking arms will snap into place, securely double-locking the cask into the structure and holding it in the upright position without the possibility of tipping forward.

Figure 2C:
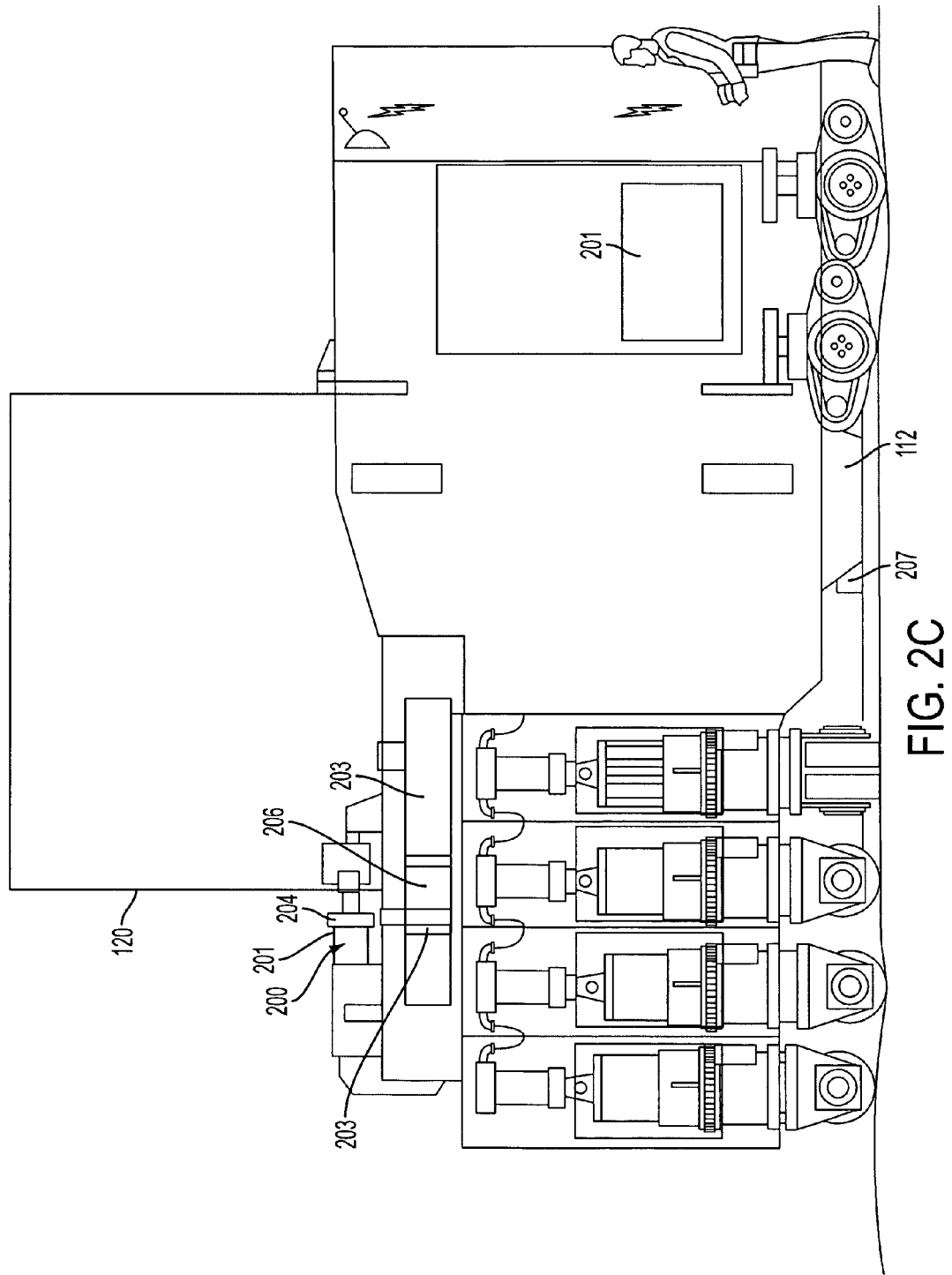
FIG. 2C is a side view of a cask tilt restraint cylinder and back up toggle links according to an embodiment of the present invention.

Referring to FIG. 2C, the cask tilt restraint cylinder 200 and the back up toggle links 203 and 206 are shown in a side view to illustrate their relative mounting positions high on the cask, and further illustrate their relationship to the opposing upper and lower solid hard rubber restraint pads 201.

Figure 2D:
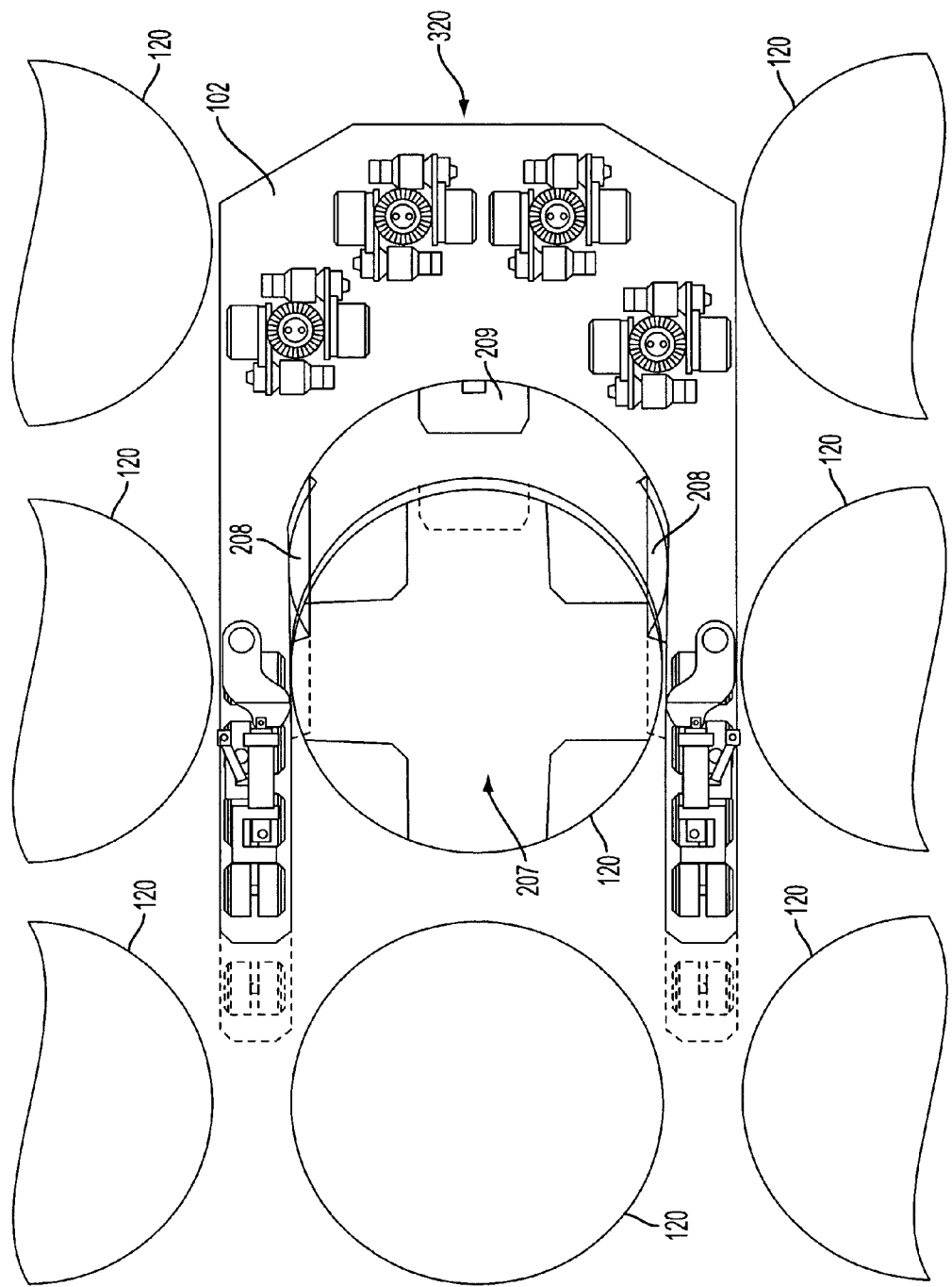
FIG. 2D is a side view of a preferred air vent engagement according to an embodiment of the present invention.

Referring to FIG. 2D, yet another, and more preferred, air vent engagement 320 is illustrated by engaging the three of the cask's air vents 207 with one center mount lifting pawl 209 and two side-mount lifting pawls 208 for better weight transfer in the cask 120 and the transporter 102.

Referring to FIG. 3, the power compartment 104 contains a combustion engine 124, generator 126, and alternate shore power connection 128. Other illustrated components of the power compartment include a processor 130, an AC electrical panel 132, a CRT display 134 and a hydraulic power unit 140. As an alternative and back-up power source to a combustion engine driven power plant, shore power may be connected to the electrical panel 132 via the shore power connection 128 to power the cask transporter 100.

Control operations of the cask transporter 100 take place in the processor 130. The processor 130 includes a machine logic controller 150 to control each of the stack axle assemblies 10 and uniload axle assemblies 106. The machine logic controller 150 includes a steering mode controller 152 for linear, lateral, diagonal, and rotational control of the stack axle assemblies 10 and uniload axle assemblies 106. A steering controller 154 is provided to perform multi-axle steering algorithm calculations. The steering controller 154 further includes a slew gear motor controller 158 to control the speed and direction of the slew gear motor and a wheel module controller 156 to control the wheel motors. A suspension controller 160 includes a lift/lower controller 162 to lift and lower the transporter 100 and a mean travel height controller 164. An engine/generator controller 166 controls the engine 124 and generator 126. The suspension controller 160 provides interaction between multiple axle assemblies 106 and 10 while negotiating undulating surface irregularities along the line of travel of the cask transporter 100. The suspension controller controls the fluid pressure acting on each of the vertical cylinders 18 in the stack axle assemblies 10 and vertical cylinders 38 in the uniload axle assemblies 106 (FIG. 4).

The stack axle assembly 10 is equipped with an array of sensors 170, including fluid pressure transducers, angularity and lift sensors, wheel speed sensors which are monitored by a processor 130. The processor 130 monitors the loading of each vertical cylinders 18, 38 adds or removes fluid to maintain the loading within the prescribed tolerance for the load being carried, thereby assuring proportional loading across every lift point. It is to be noted that in the case of a plurality of stack axle assemblies 10 and uniload axle assemblies 106, equalizing suspension can also be accomplished by dividing the total number of cylinders 18, 38 into hydraulic line interconnected groups that will allow free interchange of oil between all of the cylinders within a grouping of fluid proportional valves and drive motors.

Further, the information obtained from each of the vertical cylinder's 18, 38 pressure transducers allows the processor 130 to calculate and show on the display 134 the weight and center-of-gravity of the load being carried on a real time basis.

Figure 4:
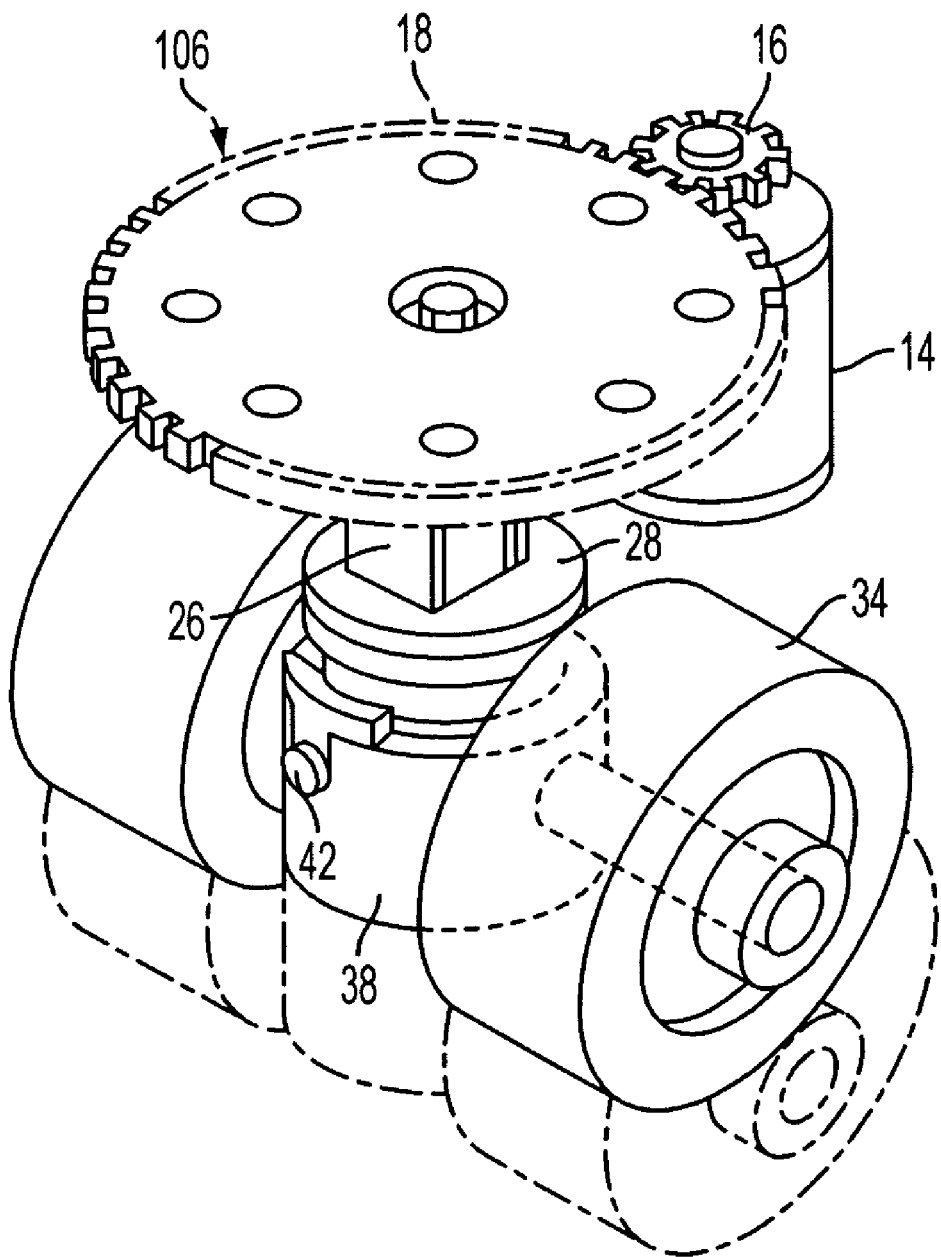
FIG. 4 is a perspective view of a uniload axle assembly according to the prior art, respectively.

Referring to FIG. 4, the uniload axle assembly 106 includes a drive motor 14 having mounted thereon a pinion gear 16 in mesh with a ring gear 18 which is bolted to a circular plate as explained hereinafter. The drive motor 14 is bolted to a piston top plate to which is secured a square machined upper shaft 26 to transmit the torque from the top plate to the wheel set via a square torque plate upper flange 28 which is sectional so that it may be removed. A pair of wheels 34 are mounted to axles which form a relatively fixed part of wheel truck 38 which includes a yoke portion. Trunnions 42 are mounted on the sides of the bottom casing which houses a piston secured to the upper shaft 26. Ongoing design versions of the same patent concept eliminate the gear motor steering for differential steering where all-wheels are electrically driven with computer controlled differential steering.

Figure 5A:
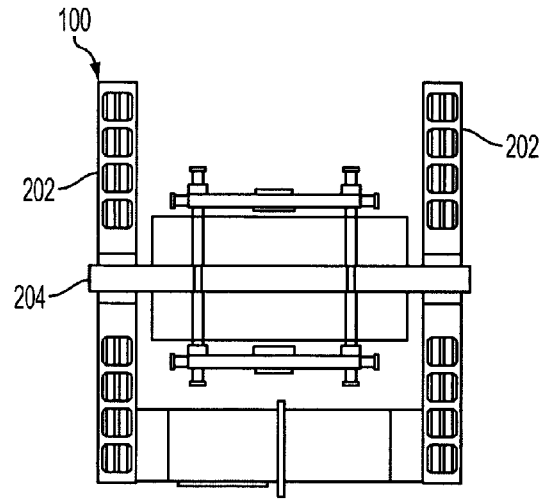
FIG. 5A is a side view of stack axle transporter according to an embodiment of the present invention.

Referring to FIG. 5A, illustrated is the adaption of a gantry crane 100 configuration, based on two multi-axle sill beams 202 that are interconnected with a raised center cross beam (204) positioned between the far ends of sill beams 202 and support an interconnecting beam 204 which has a raised center portion to allow it to pass over the decks of heavy haul trailers. The interconnecting beam 204 is also designed with a bolted connection to the sill beams 202 to accommodate field assembly and disassembly. Interconnecting beam 204 has a bolted center connection that will allow an intermediate beam to be bolted in place when a wider stance is required.

Figure 5B:
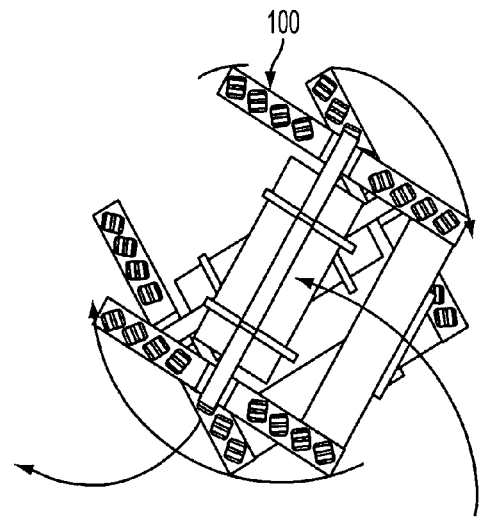
FIG. 5B is a perspective view of the stack axle transporter according to an embodiment of the present invention.

FIG. 5B illustrates the omni-directional travel capability and maneuverability of the stack axle transporter 100. The stack axle transporter 100 can rotate on-center and provide infinitely accurate maneuvers in linear, lateral, or diagonal travel patterns to allow effortless precision placement of casks in tight, and otherwise difficult to access, storage locations.

Figure 8:
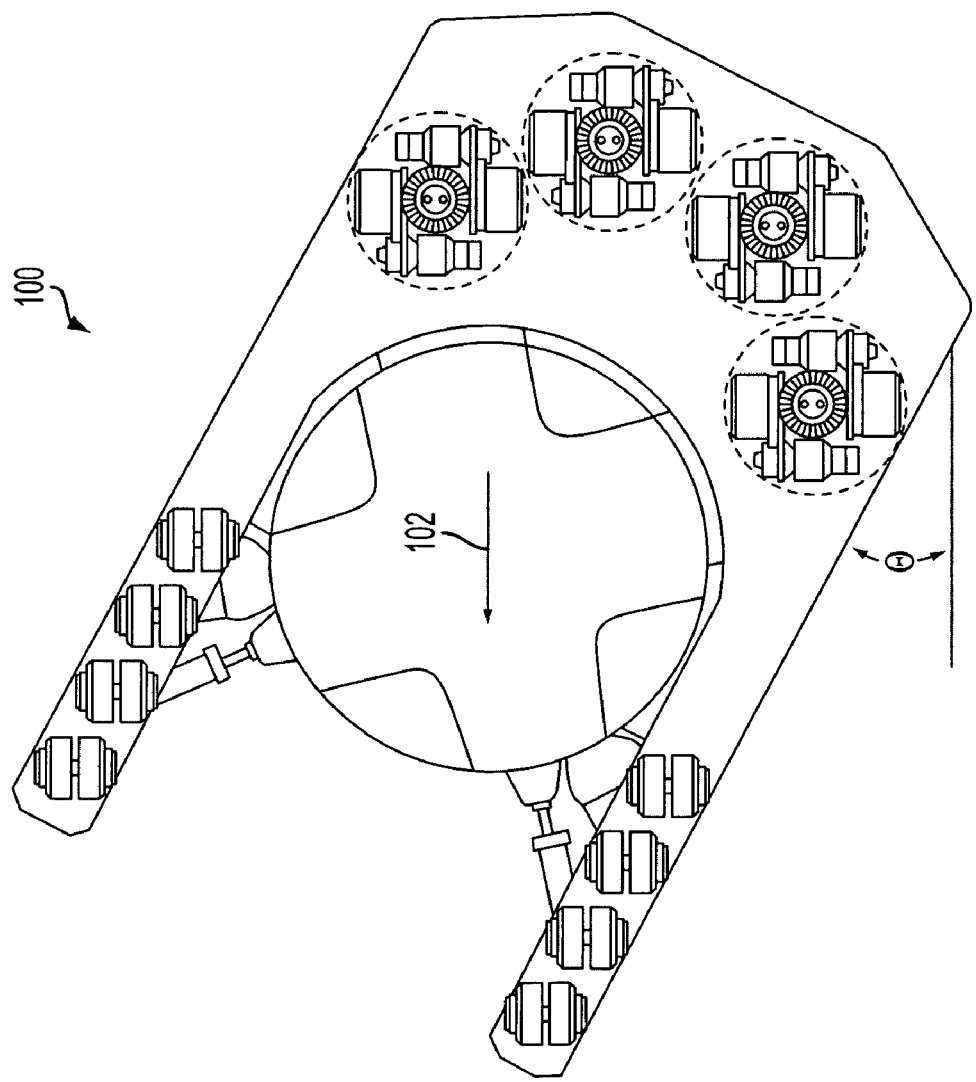
FIG. 8 is a top view showing the transporter having axles angled to the direction of travel according to an embodiment of the present invention.

While stack axle transporters will have higher surface contact pressure than specialized vertical lift gantry frames attached to crawler tractor bed assemblies, the ability of the stack axle transporter wheel assemblies to independently rotate on center with virtually zero wheel scrubbing action means that the stack axle assembles will not tear the road surface as do the crawler tracked units. This is particularly important with asphalt road surfaces. The first time a fully loaded stack axle gantry transporter drives on an asphalt road, the stack-axle tire loading may compress the asphalt much like the compression of the original roller machines that were used to install the asphalt. A method to utilize this phenomenon to advantage is the ability, through programming, to have the gantry crane transporter travel in a biased manner canted at angle $\Theta$ (about 28 degrees) off the travel line A. This will allow the wheels to track on overlapping parallel paths rather than in single file orientation as shown in FIG. 8. A wide section of the asphalt surface will evenly compress. If the facility will drive multiple passes they can compress the surrounding asphalt evenly, thereby "rutting" of the asphalt can be turned to an advantage rather than a problem. For ISFSI facilities, the travel routes between the fuel building and ISFSI are relatively short and often dedicated to cask hauling.

Figure 5C:
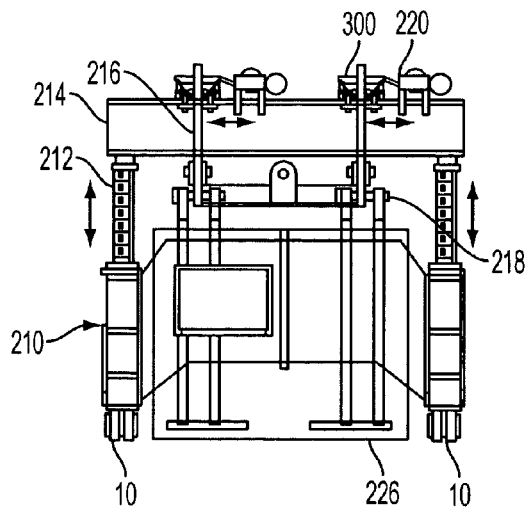
FIG. 5C is a side view showing the adaptation of the stacked axle technology into a rigging gantry configuration according to an embodiment of the present invention.

Referring now to FIG. 5C, one embodiment of a stack axle gantry configuration 210 is presented. The center of each sill beam 202 is augmented with a hydraulic vertical telescoping gantry tower 212. The hydraulic vertical telescoping gantry tower 212 is rigidly mounted to the sill beams 202 and penetrates through to within a few inches of the ground when the stack axle assemblies 10 are in their lowest positions. A bridge girder 214 is mounted to the top of the hydraulic vertical telescoping gantry tower 212. In this stack axle gantry configuration, movable lifting devices 216 lift and carry the weights of the lifting devices 216 and the spreader bar assembly 218. Each movable lifting device 216 has spring extended rollers 300, that allow them to be moved across the bridge girder 214 when not engaged with a heavy load. Each movable lifting device 216 will has a monorail-type tractor 220 running on top of the bridge girder 214. As the hydraulic vertical telescoping gantry tower 212 moves over the first HSM 226 to be placed, the operator will activate the monorail-type tractor 220 devices as necessary to best place them over the proper points to pick up the HSM 226.

Figure 5D:
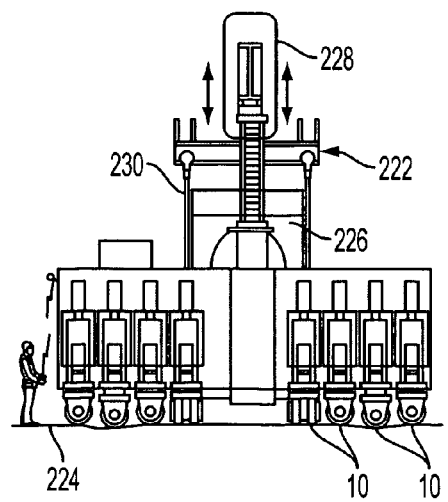
FIG. 5D is a side view showing the adaptation of the stacked axle technology into a single row gantry configuration according to an embodiment of the present invention.

Referring to FIG. 5D, The operation of the single row gantry configuration 222 is controlled from an operator's console 224. The operator console 224 is used to electronically control the functionality of the single row gantry configuration 222, specifically the lifting tool 228. In the single row gantry configuration 222, the gantry is straddling just one HSM 226. The gantry will lower, the lifting straps 230 will be threaded through the bottom air vents on the HSM 226, then lift the HSM 226 for travel to the next position point. The single row gantry configuration 222 comprises a plurality of stack axle assemblies 10 to maximize travel capability and maneuverability of the single row gantry configuration 222.

Figure 6:
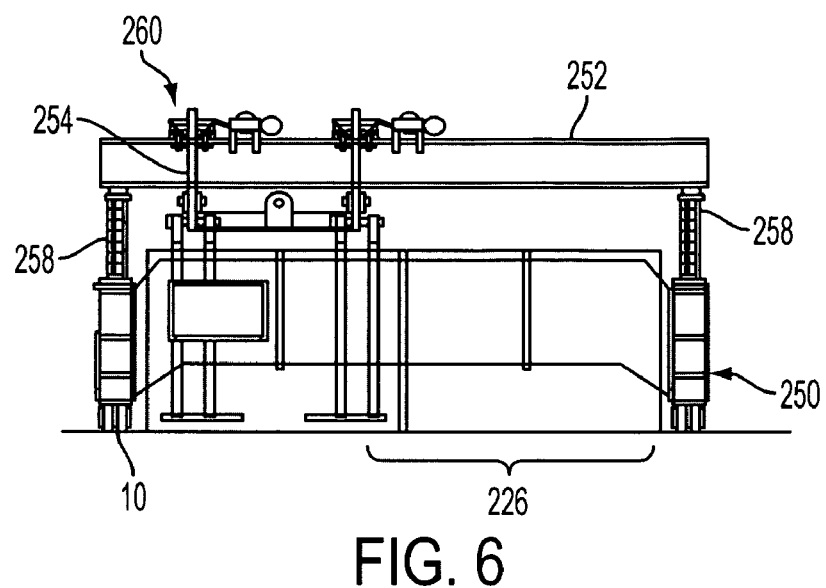
FIG. 6 is a side view of the stack axle technology adapted into a double row gantry configuration according to an embodiment of the present invention.
Figure 7A:
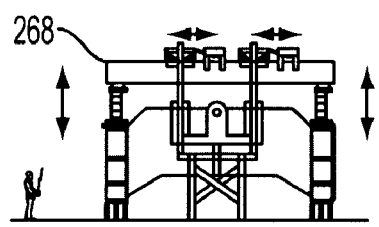
FIGS. 7A-7D are side views of both truck off-load and HSM assembly rigging gantry configurations according to an embodiment of the present invention.
Figure 7B:
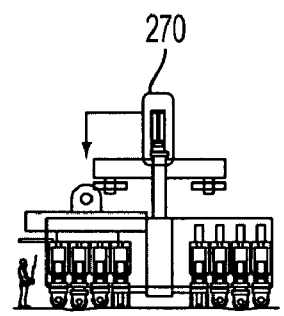
Figure 7C:
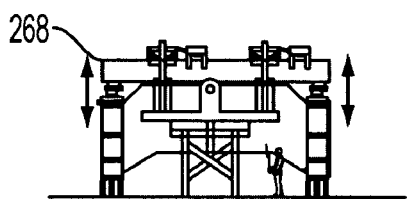
Figure 7D:
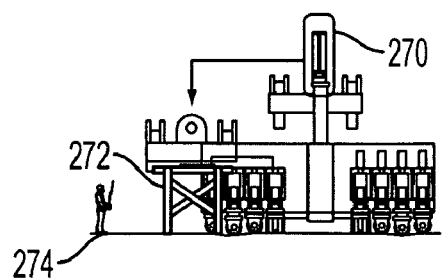

Referring now to FIG. 6, a double row gantry configuration 250 is illustrated incorporating the stack axle technology 10. For double row HSM assembly, the gantry 260 is configured to straddle at least two HSMs 226 placed end to end. Typically six to eight or more HSMs 226 are placed in a single or double line row. The gantry 260 of the double row gantry configuration 250 is assembled with an extender beam 252 placed in the center between two sill beams. In one embodiment, a longer and heavier capacity bridge beam would connect at least two gantry towers 258. The lifting devices 254 and the spreader beam 256 will be free to move to the center or to one side or the other of the heavier capacity bridge beam for first component assembly, and then precision placing the HSMs 226 in either the left or right hand positions as the double row moves forward.

Referring now to FIGS. 7A-7D, another embodiment of the gantry configuration 268 is shown which is suitable for both HSM truck off-loading and HSM assembly configuration. This configuration is necessary because it is unlikely that the HSMs will be fully assembled prior to final placement. The lifting adapter tool 270 is rectangular in shape and designed for both truck off-loading and HSM assembly. All HSM assembly can be done with the lifting adapter 270 tool in the same configuration needed for truck off-loading. Alternatively, the gantry configuration can be changed for placement of HSMs. To change between truck off-load configuration 268 and HSM placement configuration 276, the gantry will set the lifting adapter tool 270 on the elevated rack 272, then come in again at a 90 degree angle. This action is controlled by the operator from the operator console 274.

Although embodiments have been shown and described directed to a transporter to carry a spent nuclear fuel cask and handling HSMs, the stack axle assembly and transporter utilizing the stack axle assembly may be used in other applications. Specifically, it would be appreciated by those skilled in the art that changes may be made in these embodiments without departing from the principles and spirit of the invention, the scope of which is defined in the claims and their equivalents.

What is claimed is:

1. A cask transporter, comprising:
   a main body including a power compartment and a plurality of uniload axle or stack axle assemblies;
   two arms extending from the main body, each of the arms including a plurality of stack axle assemblies; and
   pawls formed on the arms and the main body to engage a cask,
   wherein the power compartment includes
      a power source;
      a processor;
      an AC electrical panel;
      a display; and
      a hydraulic power unit.

2. The cask transporter according to claim 1, wherein the uniload axle assemblies comprise:
   an axle frame including a cylinder housing and hydraulic piston; and
   two or more wide faced solid elastomeric wheels on opposing sides of the axle frame,
   wherein the wheels are on each end of the axle frame and are independently driven by an electric motor.

3. The cask transporter according to claim 2, wherein the axle frame is center tilting.

4. The cask transporter according to claim 1, wherein the stack axle assemblies comprise:
   a slew gear;
   an upper bearing;
   a lower bearing;
   a vertical cylinder retained by the slew gear, upper bearing and lower bearing;
   an independent driver wheel and idler wheel revolving on a common shaft/trunnion assembly attached to the bottom of the vertical cylinder;
   a frame assembly formed on top of the vertical cylinder, the frame assembly including one more drive motors connecting an upper drive assembly downwardly to a driven assembly mounted between the idler wheel and driver wheel; and
   a slew driver motor to drive the slew gear.

5. The cask transporter according to claim 1, wherein the processor includes a machine logic controller to control each of the uniload and stack axle assemblies, the machine logic controller comprising:
   a steering mode controller to linearly, laterally, diagonally, and rotationally control the uniload and stack axle assemblies;
   a steering controller to perform steering algorithm calculations for the plurality of uniload and stack axle assemblies;
   a speed/direction controller to provide command signals to the individual uniload and stack axle assemblies; and
   a suspension controller including a lift/lower controller to lift and lower the transporter, a mean travel height controller.

6. The cask transporter according to claim 5, wherein the suspension controller controls a fluid pressure acting on each of the hydraulic pistons of each of the uniload and stack axle assemblies to provide interaction between multiple uniload and stack axle assemblies to negotiate undulating surface irregularities along a line of travel of the transporter.

7. The cask transporter according to claim 1, wherein the AC electrical panel includes a shore power connection.

8. A cask transporter, comprising:
   a main body including a power compartment and a plurality of uniload axle or stack axle assemblies;
   two arms extending from the main body, each of the arms including a plurality of stack axle assemblies;
   pawls formed on the arms and the main body to engage a cask;
   two sill beams parallel positioned at a predetermined separation distance, the two sill beams being mounted on the two arms, respectively,
   an interconnecting beam—positioned to secure the two sill beams in a U-shape;
   one or more gantry towers mounted in the center of each sill beam;
   a bridge girder mounted to the top of the gantry towers; and
   at least two movable lifting devices attached to the bridge girder.

9. The cask transporter according to claim 8, wherein the movable lifting devices comprise driven tractors positioned on top of the bridge girder.

10. The cask transporter according to claim 9, wherein the driven tractors are controlled by an operator console.

* * * * *

UNITED STATES PATENT AND TRADEMARK OFFICE
CERTIFICATE OF CORRECTION

| | |
|---|---|
| PATENT NO. | : 8,215,423 B2 |
| APPLICATION NO. | : 12/588695 |
| DATED | : July 10, 2012 |
| INVENTOR(S) | : Melvin Dean Terry |

It is certified that error appears in the above-identified patent and that said Letters Patent is hereby corrected as shown below:

Column 12, Line 51, In Claim 8, delete "beam—positioned" and insert -- beam positioned --, therefor.

Signed and Sealed this
Sixteenth Day of October, 2012

David J. Kappos
*Director of the United States Patent and Trademark Office*